(12) United States Patent
Li et al.

(10) Patent No.: US 11,150,159 B2
(45) Date of Patent: Oct. 19, 2021

(54) ADAPTIVE LOADING METHOD FOR REAL-TIME HYBRID SIMULATION TESTING OF SPACE FRAME MODEL

(71) Applicant: XI'AN UNIVERSITY OF ARCHITECTURE AND TECHNOLOGY, Shaanxi (CN)

(72) Inventors: Tengfei Li, Shaanxi (CN); Mingzhou Su, Shaanxi (CN); Yan Sui, Shaanxi (CN); Lei Ma, Shaanxi (CN); Huanxue Gong, Shaanxi (CN)

(73) Assignee: Xi'an University of Architecture and Technology, Xi'an (CN)

( * ) Notice: Subject to any disclaimer, the term of this patent is extended or adjusted under 35 U.S.C. 154(b) by 0 days.

(21) Appl. No.: 17/337,913

(22) Filed: Jun. 3, 2021

(65) Prior Publication Data

US 2021/0285844 A1   Sep. 16, 2021

Related U.S. Application Data

(63) Continuation of application No. PCT/CN2020/122497, filed on Oct. 21, 2020.

(30) Foreign Application Priority Data

Mar. 16, 2020   (CN) .......................... 202010182656.5

(51) Int. Cl.
   *G01M 7/02*   (2006.01)
(52) U.S. Cl.
   CPC ............ *G01M 7/022* (2013.01); *G01M 7/025* (2013.01)
(58) Field of Classification Search
   CPC ............................... G01M 7/002; G01M 7/025
   See application file for complete search history.

(56) References Cited

U.S. PATENT DOCUMENTS 6,752,019 B2 *  6/2004  Horiuchi ............... G01M 7/025
                                                  702/33
8,281,659 B2 * 10/2012  Napolitano ......... G01M 5/0066
                                                  73/579

(Continued)

FOREIGN PATENT DOCUMENTS

CN        103076194 A       5/2013
CN        105335610 A       2/2016

(Continued)

OTHER PUBLICATIONS

Zhang Xinghu, Ma Lei, Sui Yan, Qiang Yi, Shawn You; Research on the SRT hybrid simulation test technology in spatial structure; Jun. 30, 2014; School of Civil Engineering, Xi'an Univ. of Arch. & Tech, Xi'an 710055, China.

(Continued)

*Primary Examiner* — Matthew G Marini

(57) ABSTRACT

An adaptive loading method for real-time hybrid simulation testing based on a space frame model. The system initial delay is controlled to be close to 0 before the loading of seismic wave by a dual compensation strategy for the initial delay based on the initial delay compensation and the adaptive loading segment, thereby solving the problem of insufficient estimation and compensation of the initial delay in the real-time hybrid simulation. In addition, the test substructure of the space frame model is equated as a test element, and the overall displacement response corresponding to the test substructure in the overall model is converted to the actual loading relative displacement of the test substructure by using the signal conversion module, thereby realizing the real-time loading of the large-scale spatial frame model with great rigidity.

6 Claims, 4 Drawing Sheets

(56) References Cited

U.S. PATENT DOCUMENTS

2016/0283621 A1  9/2016 Yang et al.
2018/0026776 A1  1/2018 Lee

FOREIGN PATENT DOCUMENTS

| CN | 107356523 A | 11/2017 |
| CN | 108956074 A | 12/2018 |
| CN | 109359427 A | 2/2019 |
| CN | 109742773 A | 5/2019 |
| CN | 119132515 A | 8/2019 |
| CN | 110376894 A | 10/2019 |
| CN | 111323185 A | 6/2020 |

OTHER PUBLICATIONS

Li Tengfei, Sui Yan, Su Mingzhou, Zhang Hao, Gao Xiuyu; Study on Real Time Hybrid Simulation Test of an Eccentrically Braced Frame as Test Sub-structure; Nov. 30, 2018; School of Civil Engineering, Xi'an Univ. of Arch. & Tech, Xi'an 710055,China.
Wang Zhen, Li Qiang, Wu Bin; Adaptive Delay Compensation Method for Real-Time Hybrid Testing; Sep. 30, 2018; Key Lab of Structures Dynamic Behavior and Control of the Ministry of Education, Harbin Institute of Technology, Harbin 150090, China.

* cited by examiner

ADAPTIVE LOADING METHOD FOR REAL-TIME HYBRID SIMULATION TESTING OF SPACE FRAME MODEL

CROSS-REFERENCE TO RELATED APPLICATIONS

This application is a continuation of International Patent Application No. PCT/CN2020/122497 with a filing date of Oct. 21, 2020, which claims the benefit of priority from Chinese Patent Application No. 202010182656.5 with a filing date of Mar. 16, 2020. The content of the aforementioned applications, including any intervening amendments thereto, is incorporated herein by reference.

TECHNICAL FIELD

The present application relates to testing of civil engineering structures, and more particularly to an adaptive loading method for real-time hybrid simulation testing of a space frame model.

BACKGROUND

Real-time hybrid simulation, also known as a real-time substructure testing, is a new structure testing method developed from the substructure pseudo-dynamic testing. In the real-time hybrid simulation, the overall structure is divided into a test substructure and a numerical substructure, where the test substructure is subjected to real-time loading in the laboratory, and the numerical substructure is subjected to real-time simulation in finite element software. Since the real-time hybrid simulation can take into account the influence of loading rate on the specimen, it is conducive to collecting a more realistic dynamic response of the structure under seismic load.

In the real-time hybrid simulation testing, the estimation and compensation of system delay has always been a key consideration for researchers. Unfortunately, the existing estimation and compensation of the initial time delay is still performed only by a simple one-time compensation method, which often leads to insufficient compensation for the initial delay of the system, making the system more prone to losing the stability in the formal loading process. Moreover, the existing test objects of the real-time hybrid simulation are mostly single members with smaller stiffness, and there are still few real-time loading tests for large-scale integral frame models with larger stiffness.

SUMMARY

An object of this application is to provide an adaptive loading method for real-time hybrid simulation testing of a space frame model to overcome the defects in the prior art, in which the estimation and compensation of the initial delay has been taken into full consideration.

The technical solutions of the disclosure are described as follows.

The present disclosure provides an adaptive loading method for real-time hybrid simulation testing of a space frame model, comprising:

(1) dividing the space frame model into a test substructure and a numerical substructure, and selecting a top frame of the test substructure;

(2) establishing a model of the numerical substructure and selecting seismic waves to define a load condition;

(3) arranging a loading device of the test substructure of the space frame model;

(4) carrying out setting of test control, definition of test equipment, definition of test site and establishment of test element;

(5) preloading the test substructure through the loading device; estimating an initial delay of a loading system based on a feedback data; and inputting the initial delay into an initial delay module of a target computer, to complete a compensation for the initial delay before a formal loading;

(6) based on the compensation for the initial delay in step (5), correcting the load condition defined in step (2), and defining a record of a 2-second adaptive loading segment before each selected real seismic wave record;

(7) starting test loading; and performing another compensation for the initial delay of the loading system in an adaptive loading stage using the target computer with an adaptive feedforward delay method;

(8) in the formal loading, calculating a target displacement $y(t_i+\tau)$ of the test substructure at a moment of $t_i+\tau$; converting the target displacement $y(t_i+\tau)$ into a relative displacement $\Delta y(t_i+\tau)$ relative to a bottom of the test substructure; predicting, by the target computer, the relative displacement $\Delta y(t_i+\tau)$ and sending a command displacement $\Delta u(t_i)$ considering an amplitude gain at a moment of $t_i$ to an actuator, such that an advance time $\Delta t$ is equal to an estimated value $\tau$ of the delay of the loading system;

(9) after the actuator reaches the command displacement, measuring, by a force sensor, a reaction force $f_i$ of the test substructure; feeding back the reaction force to obtain a current restoring force of the test substructure in the space frame model; and

(10) setting $i=i+1$; and repeating steps (8) and (9) until all seismic waves are loaded.

In some embodiments, in step (2), the model of the numerical sub-structure is established by using an OpenSEES numerical simulation software.

In some embodiments, in step (4), the test element is established on a substructure testing and communication platform OpenFresco.

In some embodiments, in step (6), a peak value of an acceleration in the adaptive loading segment is less than 5% of a peak value of a real seismic record, and a frequency of the adaptive loading segment avoids a main frequency band of seismic waves.

In some embodiments, in steps (5), (7) and (8), the target computer comprises an adaptive feed-forward delay compensator (AFC) based on displacement prediction, and is configured to predict a displacement signal by using a recursive least squares algorithm to realize delay compensation of the loading system; a transfer function model of a compensation system in the target computer is expressed as follows:

$$\frac{D(s)}{U(s)} = \frac{K\omega_0^2}{s^2 + 2\zeta\omega_0 s + \omega_0^2}; \quad (1)$$

an inverse of equation (1) is expressed as follows:

$$\frac{U(s)}{D(s)} = \frac{s^2 + 2\zeta\omega_0 s + \omega_0^2}{K\omega_0^2}; \quad (2)$$

in equation (2), D (s) and U(s) are respectively an output Laplace transform function and an input Laplace transform function; s is a Laplace variable of the transfer function model; $\omega_0$ and $\zeta$ are respectively a frequency and a damping ratio of the actuator; and K is a gain of the transfer function model;

a state differential equation of the equation (2) in time domain is expressed as follows:

$$u(t)=a_0 d(t)+a_1 \dot{d}(t)+a_2 \ddot{d}(t) \qquad (3);$$

in equation (3), $a_0=1/K$; $a_1=2\zeta/K\omega_0$; $a_2=1/K\omega_0^2$; $a_0$, $a_1$, and $a_2$ are unknown and are not constant, and thus need to be determined through an online adaptive optimization process;

the state differential equation (3) is transformed into an equation (4) in a matrix form as follows:

$$\begin{bmatrix} \hat{u}_{k-1} \\ \hat{u}_{k-2} \\ \cdots \\ \hat{u}_{k-q} \end{bmatrix} = \begin{bmatrix} d_{k-1} & \dot{d}_{k-1} & \ddot{d}_{k-1} \\ d_{k-2} & \dot{d}_{k-2} & \ddot{d}_{k-2} \\ \cdots & \cdots & \cdots \\ d_{k-q} & \dot{d}_{k-q} & \ddot{d}_{k-q} \end{bmatrix} \begin{bmatrix} a_0 \\ a_1 \\ a_2 \end{bmatrix}, \hat{U}=Da; \qquad (4)$$

in the equation (4), a cost function of a coefficient a is expressed as follows:

$$f(a) = \sum_{i=1}^{q}(u_{k-i}-\hat{u}_{k-i})^2 = \sum_{i=1}^{q}(u_{k-i}-d_{k-i}^T a)^2 = (u-Da)^T g(u-Da); \qquad (5)$$

in equation (5), $u_{k-i}$ is an input signal actually sent to a hydraulic servo system by a control function at a moment of $t_{k-i}$, $\hat{u}_{k-i}$ is an input signal sent to the hydraulic servo system predicted by the state differential equation at the moment of $t_{k-i}$;

an optimal least squares solution of the equation (5) is expressed as follows:

$$a=(Y^T Y)^{-1} Y^T u \qquad (6);$$

an optimized coefficient a is plugged into the state differential equation to calculate an input signal $\hat{u}_{k-i+1}$ at a moment of $t_{k-i+1}$.

In some embodiments, wherein in step (8), the target displacement of the test substructure at the moment of $t_i+\tau$ is calculated using the OpenSEES numerical simulation software; and in step (9), the reaction force of the test substructure is fed back to the OpenSEES numerical simulation software.

Compared to the prior art, the present disclosure has the following beneficial effects.

In the adaptive loading method of the present disclosure, the system initial delay is controlled to be close to 0 before the loading of seismic waves by a dual compensation strategy for the initial delay based on the initial delay compensation and the adaptive loading segment, thereby solving the problem of insufficient estimation and compensation for the initial delay in the real-time hybrid simulation. In addition, the present disclosure equates the test substructure of the space frame model with a test element, and converts the overall displacement response corresponding to the test substructure in the overall model to the actual loading relative displacement of the test substructure fixed on the foundation by using the signal conversion module, thereby realizing the real-time loading of the large-scale spatial frame model with great rigidity.

Figure 1:
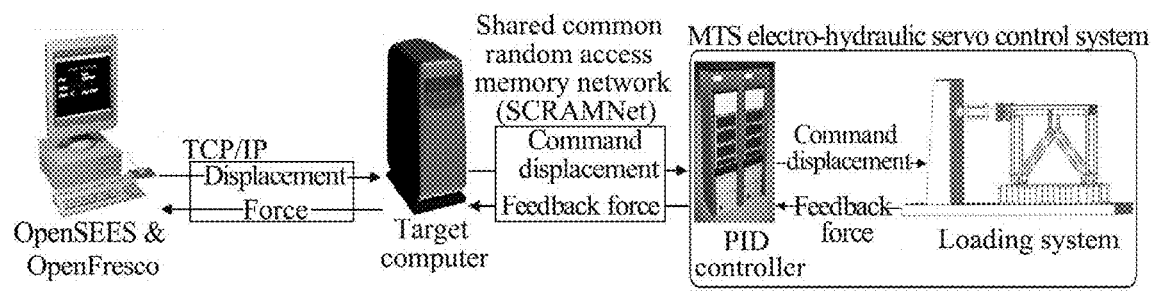
FIG. 1 is a schematic diagram of a composition of a test system according to an embodiment of the present disclosure.

In the drawings: 1, concrete reaction wall; 2, 25 t Mechanical Testing & Simulation (MTS) dynamic electrohydraulic servo actuator; 3, load distribution beam; 4, test substructure; 5, ground beam; and 6, anchor bolt.

DETAILED DESCRIPTION OF EMBODIMENTS

The present disclosure will be further described below in conjunction with the accompanying drawings.

Figure 2:
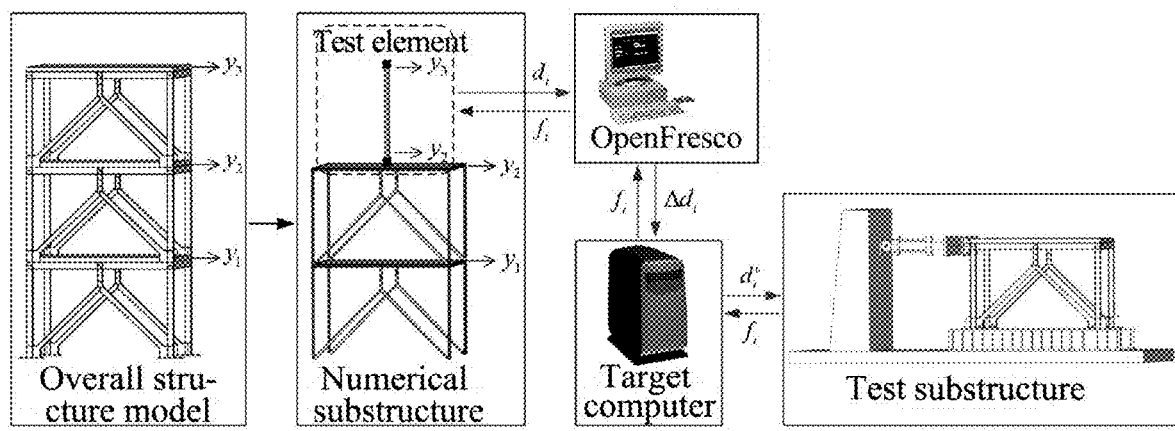
FIG. 2 schematically illustrates a signal conversion of a real-time hybrid simulation of a space frame model according to an embodiment of the present disclosure.

Referring to FIGS. 1-2, an adaptive loading method provided herein for real-time hybrid simulation testing of a space frame model includes the following steps.

(1) The space frame model is divided into a test substructure and a numerical substructure, and a top frame of the test substructure is selected.

(2) A model of the numerical substructure is established by using an OpenSEES numerical simulation software and seismic waves are selected to define a load condition.

(3) A loading device of the test substructure of the space frame model is arranged.

(4) A setting of test control, a definition of test equipment, a definition of test site and an establishment of test element are carried out on a substructure testing and communication platform OpenFresco.

(5) The test substructure is preloaded through the loading device. An initial delay of a loading system is estimated based on a feedback data. The initial delay is inputted into an initial delay module in a target computer, to complete a compensation for the initial delay before a formal loading.

(6) Based on the compensation for the initial delay in step (5), the load condition defined in step (2) is corrected, and a record of a 2-second adaptive loading segment is defined before each selected real seismic wave record is recorded.

(7) A test loading is started. The initial delay of the loading system is further compensated in an adaptive loading stage using a target computer with an adaptive feedforward delay method.

(8) In the formal loading, a target displacement $y(t_i+\tau)$ of the test substructure at a moment of $t_i+\tau$ is calculated by using the OpenSEES numerical simulation software. The target displacement $y(t_i+\tau)$ is converted into a relative displacement $\Delta y(t_i+\tau)$ relative to a bottom of the test substructure. The relative displacement $\Delta y(t_i+\tau)$ is predicted by the target computer and a command displacement $\Delta u(t_i)$ considering an amplitude gain at a moment of $t_i$ is sent to an actuator, such that an advance time $\Delta t$ is equal to an estimated value $\tau$ of the delay of the loading system.

(9) After the actuator reaches the command displacement, a reaction force $f_i$ of the test substructure is measured by a force sensor. The reaction force is fed back to obtain a current restoring force of the test substructure in the space frame model.

(10) It is set that i=i+1, and steps (8) and step (9) are repeated until all seismic waves are loaded.

The test object is a rigid multi-layer space frame structure, and a top frame of the overall model is selected as the test substructure for real-time loading testing.

The target computer includes an adaptive feed-forward delay compensator (AFC) based on displacement prediction, which predicts the displacement signal by using the recursive least squares algorithm to realize the system delay compensation. In the real-time hybrid simulation testing, time delay is the main factor that affects the accuracy and robustness of the loading system. In order to avoid distortion of the simulation results due to the excessive initial delay in the formal loading stage, this testing method proposes a dual compensation strategy of the initial delay including a first compensation of the initial delay and a second compensation in an adaptive loading segment.

Embodiment 1

Figure 8:
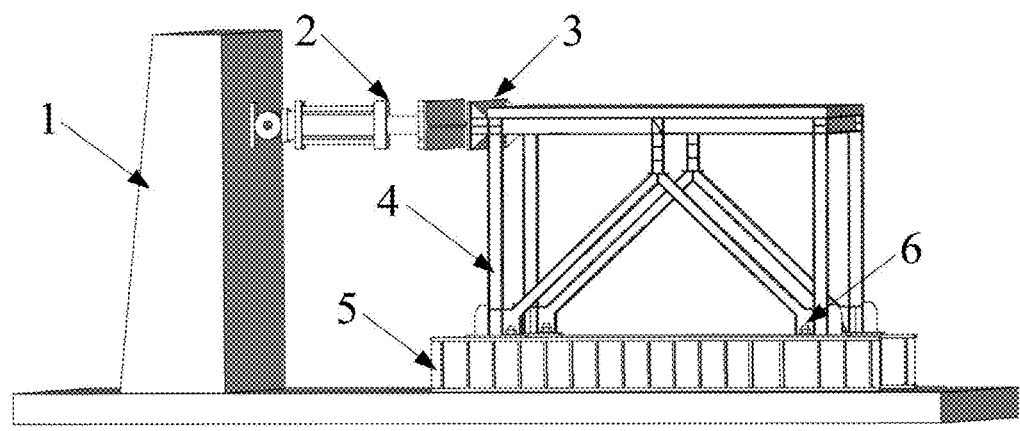
FIG. 8 shows a loading device of the test substructure of the space frame model according to an embodiment of the present disclosure.

A prototype structure of the present disclosure is a three-layer eccentric brace frame, in which a top space frame part is taken as the test substructure, and the remaining part is used as the numerical substructure. As shown in FIG. 8, the test substructure 4 is fixed on the ground beam 5 by anchor bolts 6. The top beam of the test substructure 4 is fixed with a loading distribution beam 3, and the loading distribution beam 3 is connected to a 25 t MTS dynamic electro-hydraulic servo actuator 2 fixed on the concrete reaction wall 1.

The specific process of the present invention is as follows.

(1) The space frame model is divided into a test substructure and a numerical substructure, and a top-level frame with greater rigidity instead of a single member in the general testing is selected for the test substructure.

(2) A model of the numerical substructure is established by using an OpenSEES numerical simulation software and seismic waves are selected to define a load condition.

Figure 3:
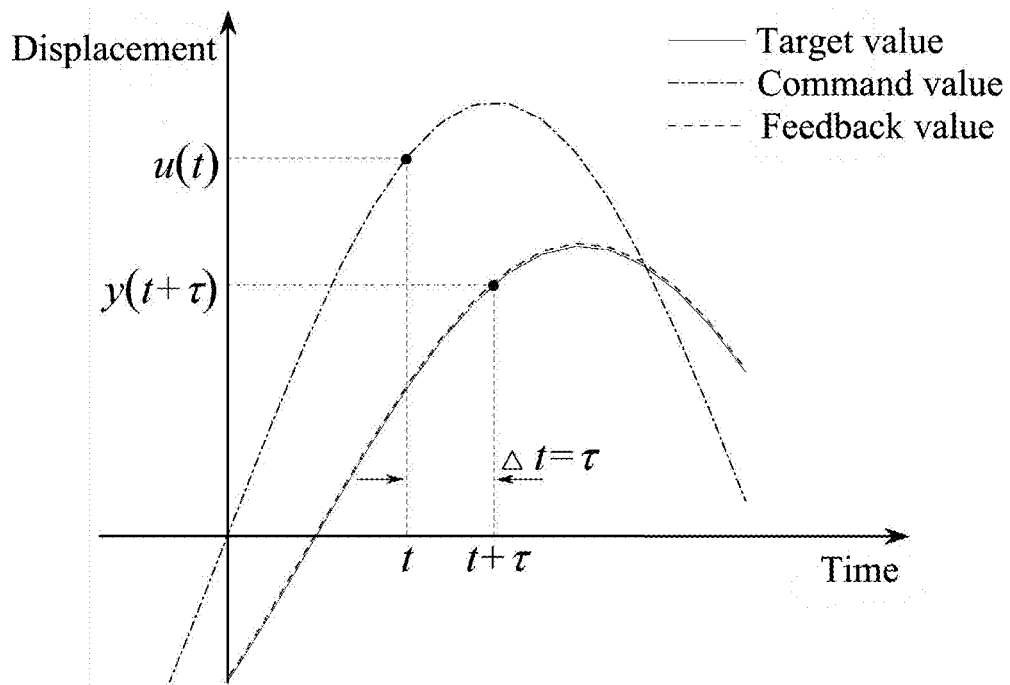
FIG. 3 schematically shows prediction performed by a delay compensator based on a displacement signal according to an embodiment of the present disclosure.
Figure 4:
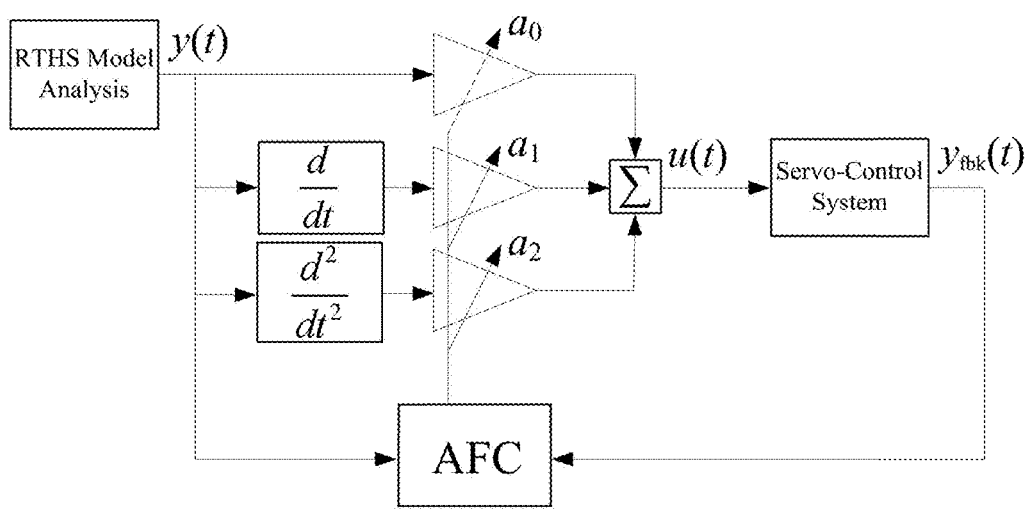
FIG. 4 shows a principle of a signal prediction of the delay compensator according to an embodiment of the present disclosure.

(3) Referring to FIG. 2, the beam-column test element in the OpenFresco is adopted for equivalent communication of the test substructure. According to the rigid floor assumption, it can be considered that the translational motions of all nodes in the floor plane are consistent. At this time, the horizontal displacement is the main freedom. The test substructure can be regarded as an integral element. The Multi-point Constraints are adopted to ensure that the displacement response of the top of the numerical substructure is consistent with that of the bottom of the test element. The horizontal displacement of an apex of the test element represents the top displacement of the test substructure as a whole, and the horizontal stiffness of the test element reflects the overall horizontal rigidity of the test substructure frame (4) Referring to FIGS. 3-4, the displacement signal is predicted and estimated by using the adaptive feed-forward delay compensator (AFC) in the target computer to realize the compensation of the time delay of the loading system.

Figure 5:
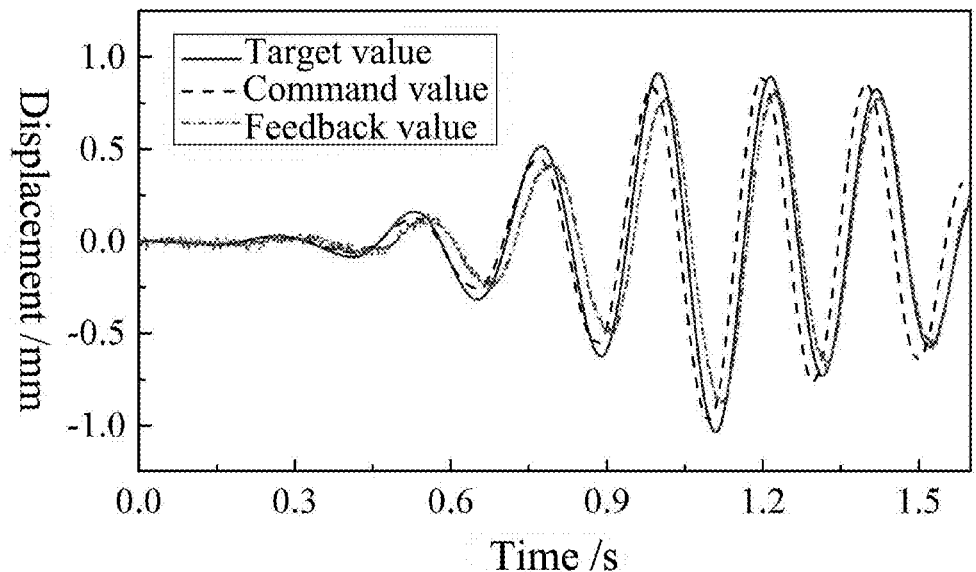
FIG. 5 shows results of a real-time hybrid simulation without an adaptive loading segment according to an embodiment of the present disclosure.

(5) Referring to FIG. 5, the test substructure is preloaded through the loading device. An initial delay of a loading system is estimated based on a feedback data. The initial delay is inputted into an initial delay module in a target computer, to complete a compensation for the initial delay before the formal loading. It can be seen from the results of the preload testing that the feedback displacement has a good agreement with the target displacement after about 1.5 seconds due to the failure of effective initial delay compensation.

Figure 6:
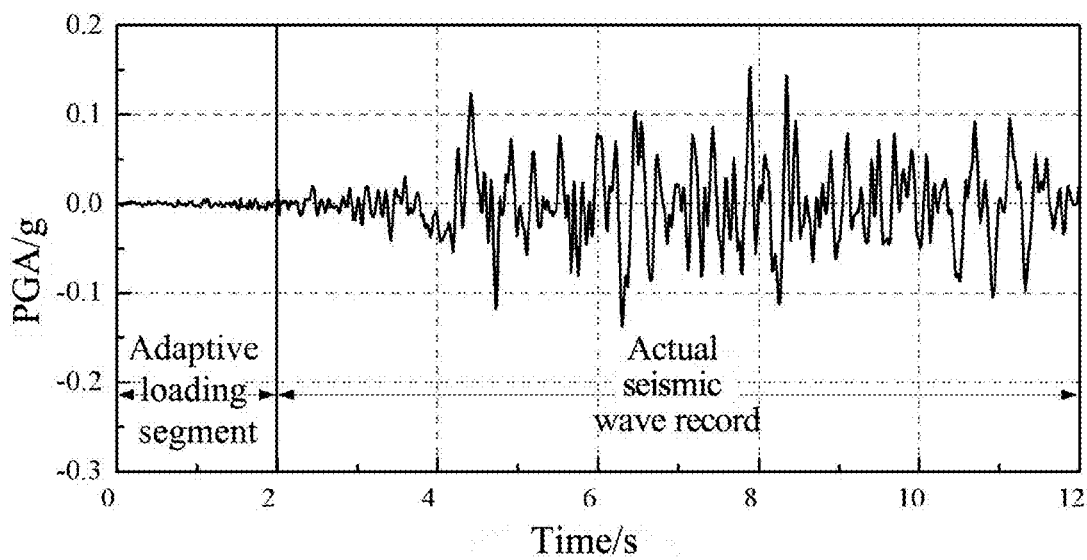
FIG. 6 shows an original seismic wave record after adding a 2-second adaptive loading segment according to an embodiment of the present disclosure.

(6) Referring to FIG. 6, in order to avoid the deterioration of the stability of the testing system in the formal loading stage due to the initial time delay compensation and insufficient estimation, a record of a 2-second adaptive loading segment is defined before each selected real seismic wave record in step (2). A peak value of an acceleration in the adaptive loading segment is less than 5% of a peak value of a real seismic record, and a frequency of the adaptive loading segment avoids a main frequency band of the seismic wave.

(7) Referring to FIG. 2, a real-time hybrid simulation testing of the space frame model is started. It is supposed that the displacement responses of each layer of the overall model at a moment of $t_i$ are $y_1$, $y_2$ and $y_3$, respectively. In the corresponding hybrid simulation model, the displacement responses of the first floor and second floor of the numerical substructure are $y_1$ and $y_2$, where $y_2$ is a displacement response at a bottom of the test element, and $y_3$ is displacement response at a top of the test element. The OpenFresco converts the calculated displacement $d_i=y_3$ of the test substructure into a relative target displacement $\Delta d_i=y_3-y_2$ loaded by the actuator. Then the target computer performs the amplitude gain of the target displacement $\Delta d_i$ as the command displacement $\Delta d_i^c$ and sends it to the controller in advance. The actuator receives the command and executes loading to obtain the reaction force as $f_i$. The reaction force signal is fed back to the OpenSEES to perform the next analysis of the hybrid simulation model until the end of seismic wave loading.

Figure 7:
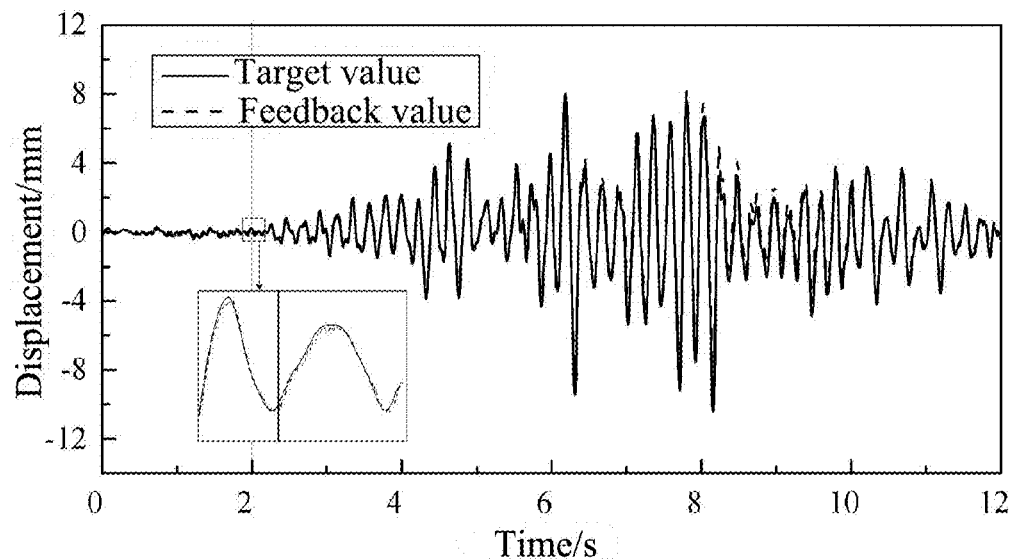
FIG. 7 shows results of the real-time hybrid simulation testing after adding the adaptive loading segment according to an embodiment of the present disclosure.

(8) The analysis results of the real-time hybrid simulation test are shown in FIG. 7. From the partial enlarged view of the feedback displacement signal and the target displacement signal in the time domain, it can be seen that by using a dual compensation strategy for the initial delay based on the initial delay compensation and the adaptive loading segment, the system stability can be maintained in the optimal state before the seismic waves are loaded.

What is claimed is:

1. An adaptive loading method for real-time hybrid simulation testing for a space frame model, comprising:
   (1) dividing the space frame model into a test substructure and a numerical substructure, and selecting a top frame of the test substructure;
   (2) establishing a model of the numerical substructure and selecting seismic waves to define a load condition;
   (3) arranging a loading device of the test substructure of the space frame model;
   (4) carrying out setting of test control, definition of test equipment, definition of test site and establishment of test element;
   (5) preloading the test substructure through the loading device; estimating an initial delay of a loading system based on a feedback data; and inputting the initial delay into an initial delay module of a target computer, to complete a compensation for the initial delay before a formal loading;

(6) based on the first compensation for the initial delay in step (5), correcting the load condition defined in step (2), and defining a record of a 2-second adaptive loading segment before each selected real seismic wave record;

(7) starting test loading; and performing another compensation for the initial delay of the loading system in an adaptive loading stage using the target computer with an adaptive feedforward delay method;

(8) in the formal loading, calculating a target displacement $y(t_i+\tau)$ of the test substructure at a moment of $t_i+\tau$; converting the target displacement $y(t_i+\tau)$ into a relative displacement $\Delta y(t_i+\tau)$ relative to a bottom of the test substructure; predicting, by the target computer, the relative displacement $\Delta y(t_i+\tau)$ and sending, by the target machine, a command displacement $\Delta u(t_i)$ considering an amplitude gain at a moment of $t_i$ to an actuator, such that an advance time $\Delta t$ is equal to an estimated value $\tau$ of the delay of the loading system;

(9) after the actuator reaches the command displacement, measuring, by a force sensor, a reaction force $f_i$ of the test substructure; feeding back the reaction force to obtain a current restoring force of the test substructure in the space frame model; and

(10) setting i=i+1; and repeating steps (8) and (9) until all seismic waves are loaded.

2. The adaptive loading method of claim 1, wherein in step (2), the model of the numerical sub-structure is established by using an OpenSEES numerical simulation software.

3. The adaptive loading method of claim 1, wherein in step (4), the test element is established on a substructure testing and communication platform OpenFresco.

4. The adaptive loading method of claim 1, wherein in step (6), a peak value of an acceleration in the adaptive loading segment is less than 5% of a peak value of a real seismic record, and a frequency of the adaptive loading segment avoids a main frequency band of seismic waves.

5. The adaptive loading method of claim 1, wherein in steps (5), (7) and (8), the target computer comprises an adaptive feed-forward delay compensator (AFC) based on displacement prediction, and is configured to predict a displacement signal by using a recursive least squares algorithm to realize delay compensation of the loading system; a transfer function model of a compensation system is expressed as follows:

$$\frac{D(s)}{U(s)} = \frac{K\omega_0^2}{s^2 + 2\zeta\omega_0 s + \omega_0^2}; \quad (1)$$

an inverse of equation (1) is expressed as follows:

$$\frac{U(s)}{D(s)} = \frac{s^2 + 2\zeta\omega_0 s + \omega_0^2}{K\omega_0^2}; \quad (2)$$

in equation (2), D(s) and U(s) are respectively an output Laplace transform Function and an input Laplace transform function; s is a Laplace variable of the transfer function model; $\omega_0$ and $\zeta$ are respectively a frequency and a damping ratio of the actuator; and K is a gain of the transfer function model;

a state differential equation of the equation (2) in time domain is expressed as follows:

$$u(t) = a_0 d(t) + a_1 \dot{d}(t) + a_2 \ddot{d}(t) \quad (3);$$

in equation (3), $a_0=1/K$; $a_1=2\zeta/K\omega_0$; $a_2=1/K\omega_0^2$; $a_0$, $a_1$ and $a_2$ are unknown and are not constant, and thus need to be determined through an online adaptive optimization process;

the state differential equation (3) is transformed into an equation (4) in a matrix form as follows:

$$\begin{bmatrix} \hat{u}_{k-1} \\ \hat{u}_{k-2} \\ \cdots \\ \hat{u}_{k-q} \end{bmatrix} = \begin{bmatrix} d_{k-1} & \dot{d}_{k-1} & \ddot{d}_{k-1} \\ d_{k-2} & \dot{d}_{k-2} & \ddot{d}_{k-2} \\ \cdots & \cdots & \cdots \\ d_{k-q} & \dot{d}_{k-q} & \ddot{d}_{k-q} \end{bmatrix} \begin{bmatrix} a_0 \\ a_1 \\ a_2 \end{bmatrix}, \hat{U} = Da; \quad (4)$$

in the equation (4), a cost function of a coefficient a is expressed as follows:

$$f(a) = \sum_{i=1}^{q}(u_{k-i} - \hat{u}_{k-i})^2 = \sum_{i=1}^{q}(u_{k-i} - d_{k-i}^T a)^2 = (u - Da)^T g(u - Da); \quad (5)$$

in equation (5), $u_{k-i}$ is an input signal actually sent to a hydraulic servo system by a control function at a moment of $t_{k-i}$; $\hat{u}_{k-i}$ is an input signal sent to the hydraulic servo system predicted by the state differential equation at the moment of $t_{k-i}$;

an optimal least squares solution of the equation (5) is expressed as follows:

$$a = (Y^T Y)^{-1} Y^T u \quad (6);$$

an optimized coefficient a is plugged into the state differential equation to calculate an input signal $\hat{u}_{k-i+1}$ at a moment of $t_{k-i+1}$.

6. The adaptive loading method of claim 1, wherein in step (8), the target displacement of the test substructure at the moment of $t_i+\tau$ is calculated using the OpenSEES numerical simulation software; and in step (9), the reaction force of the test substructure is fed back to the OpenSEES numerical simulation software.

* * * * *